United States Patent
Han et al.

(10) Patent No.: US 10,136,078 B2
(45) Date of Patent: Nov. 20, 2018

(54) RANDOM GRATING BASED COMPRESSIVE SENSING WIDEBAND HYPERSPECTRAL IMAGING SYSTEM

(71) Applicant: Shanghai Institute of Optics And Fine Mechanics, Chinese Academy of Sciences, Shanghai (CN)

(72) Inventors: Shensheng Han, Shanghai (CN); Zhentao Liu, Shanghai (CN); Jianrong Wu, Shanghai (CN); Enrong Li, Shanghai (CN); Shiyu Tan, Shanghai (CN); Zhe Chen, Shanghai (CN)

(73) Assignee: Shanghai Institute of Optics And Fine Mechanics, Chinese Academy of Sciences, Shanghai (CN)

(*) Notice: Subject to any disclaimer, the term of this patent is extended or adjusted under 35 U.S.C. 154(b) by 142 days.

(21) Appl. No.: 15/408,111

(22) Filed: Jan. 17, 2017

(65) Prior Publication Data
US 2017/0126990 A1    May 4, 2017

Related U.S. Application Data

(63) Continuation-in-part of application No. PCT/CN2014/083690, filed on Aug. 5, 2014.

(30) Foreign Application Priority Data

Jul. 22, 2014    (CN) .......................... 2014 1 0348475

(51) Int. Cl.
H04N 5/33        (2006.01)
G01J 3/28        (2006.01)
(Continued)

(52) U.S. Cl.
CPC ................ *H04N 5/332* (2013.01); *G01J 3/18* (2013.01); *G01J 3/2823* (2013.01);
(Continued)

(58) Field of Classification Search
CPC ...................................................... H04N 5/332
See application file for complete search history.

(56) References Cited

U.S. PATENT DOCUMENTS 3,781,110 A * 12/1973 Leitz ...................... G02B 27/40
250/201.7
3,953,728 A *  4/1976 Leitz ...................... G02B 7/365
250/201.7
(Continued)

FOREIGN PATENT DOCUMENTS

CN         101893552 A     11/2010
CN         102706450 A     10/2012
(Continued)

OTHER PUBLICATIONS

Gong, Wenlin et al., "Experimental investigation of the quality of lensless super-resolution ghost imaging via sparsity constraints," Physics Letters A, vol. 376, pp. 1519-1522 (Mar. 14, 2012).

*Primary Examiner* — James Pontius
(74) *Attorney, Agent, or Firm* — Mei & Mark LLP; Manni Li

(57) ABSTRACT

A random grating based compressive sensing wideband hyperspectral imaging system comprising a front imaging component, an optical splitting component, more than two branches, and a computer, with each branch having an exit pupil transformation component and a compressive spectral imaging component. The system is based on compressive sensing theory, makes use of the correlation between spectra, increases compression rate on the spectral dimension, realizes three-dimensional compressive collection of wideband spectral image data, and greatly reduces data collection amount. The system is capable of measuring spectral image information on a wideband spectrum with a single exposure, and may obtain high spatial resolution and high spectral resolution by means of designing the random gratings on the various spitting paths.

7 Claims, 2 Drawing Sheets

(51) Int. Cl.
*G01J 3/18* (2006.01)
*G02B 27/10* (2006.01)
*H04N 5/225* (2006.01)
*H04N 5/372* (2011.01)

(52) U.S. Cl.
CPC ....... *G02B 27/1066* (2013.01); *H04N 5/2254* (2013.01); *H04N 5/372* (2013.01); *G01J 2003/2826* (2013.01)

(56) References Cited

U.S. PATENT DOCUMENTS

| | | | | |
|---|---|---|---|---|
| 4,188,102 | A * | 2/1980 | Schaefer | G01C 3/32 396/111 |
| 4,429,964 | A * | 2/1984 | Schaefer | G03B 13/20 396/111 |
| 6,259,561 | B1 * | 7/2001 | George | G02B 5/0221 359/566 |
| 2006/0051024 | A1 * | 3/2006 | Levola | G02B 5/1842 385/37 |
| 2007/0296965 | A1 | 12/2007 | Brady et al. | |
| 2012/0197592 | A1 * | 8/2012 | Ku | G01B 11/22 702/166 |
| 2013/0128042 | A1 | 5/2013 | Bridge et al. | |

FOREIGN PATENT DOCUMENTS

| | | |
|---|---|---|
| CN | 102818631 A | 12/2012 |
| CN | 102914367 A | 2/2013 |
| CN | 103453993 A | 12/2013 |

\* cited by examiner

-- Prior Art --

RANDOM GRATING BASED COMPRESSIVE SENSING WIDEBAND HYPERSPECTRAL IMAGING SYSTEM

CROSS-REFERENCE TO RELATED APPLICATIONS

The subject application is a continuation-in-part of PCT/CN2014/083690 filed on Aug. 5, 2014, which claims priority on Chinese patent application 201410348475.X filed on Jul. 22, 2014 in China. The contents and subject matter of the PCT international application and Chinese priority application are incorporated herein by reference.

FIELD OF INVENTION

The present invention relates to a compressive sensing wideband hyperspectral imaging system, particularly, a random grating based compressive sensing wideband hyperspectral imaging system.

BACKGROUND ART

Wideband hyperspectral imaging is a process where both the two-dimensional spatial image information and the one-dimensional spectral information of an object are obtained, and where three-dimensional image data are collected with the data format as shown in FIG. 1. As the current detectors are all two-dimensional, traditional wideband hyperspectral imaging systems require time scanning to obtain three-dimensional spectral image data. Wideband hyperspectral imaging encompasses a wide region in the spectrum from ultraviolet to mid-far infrared, thus, the process involves numerous bands and huge amount of data. Therefore, it is an urgent need in the spectral imaging to decrease the number of detecting units and scanning time in addition to obtaining high spatial resolution and high spectral resolution.

Compressive sensing theory is a brand-new signal collecting and coding-decoding theory. Data are compressed in the signal collecting stage, thus, the amount of data collection is reduced as well as the amount of detecting data in the wideband hyperspectral imaging technique. The fundamental principle is as follows: signal X is supposed to be detected and has a length of N, and an orthogonal base $\Psi=[\Psi_1\ \Psi_2\ \ldots\ \Psi_N]$ exists such that X expands on the orthogonal base, that is, $X=\Psi X'$, and satisfies the condition that X' comprises only a small number of non-zero elements or that a majority of elements in X' are relatively small in comparison to the rest. In another words, signal X is sparse or compressible under the orthogonal base $\Psi$. Under such condition, measurement matrix $\Phi$ that is uncorrelated with $\Psi$ is adopted to conduct a projection measurement on signal X to obtain a vector Y with a length M, that is $Y=\Phi\Psi X'$. By solving the nonlinear optimization problem:

$$\min_{X'} \frac{1}{2}\|Y - \Phi\Psi X'\|_2^2 + \tau\|X'\|_1, \quad (1)$$

there is high probability that X may be reconstructed under the condition of M<<N, where M is the number of data points to be collected, and N is the number of data points recovered. As it may be seen, adoption of the theory results in substantial reduction of the amount of data for collecting. In contrast to the traditional signal collecting process, the signal collecting process based on the theory comprises two steps. The first step is to conduct projection measurement on the signal via the measurement base that is uncorrelated to the signal expression base; the second step is to reconstruct the signal by means of a nonlinear optimization algorithm. According to the theory of compressive sensing, a condition for compressive collection on signal X is that X is sparse under a certain expression base $\Psi$, and that the measurement matrix $\Phi$ is uncorrelated with the expression matrix $\Psi$. Image message of the majority of objects in the nature is sparse when expanded under certain orthogonal base (for example, a wavelet transformation base), with a high redundancy of image message between neighboring spectral bands, and thus, compression of three-dimensional spectral image message is realizable. In addition, Gauss random measuring matrix is uncorrelated with any orthogonal base, constituting a competent measurement matrix. All of these knowledge help to lay a theoretical foundation for the application of compressive sensing on the wideband hyperspectral imaging.

On the basis of the compressive sensing theory, the Baraniuk group at Rice University in the United States realizes imaging by means of a "compressive sensing single pixel camara." The camara employs only one single pixel detector for multiple measurements to realize two-dimensional imaging on an object. With the help of a digital micro device (DMD), light penetrates certain spatial locations while gets lost in the other locations; and by means of spatial random amplitude modulation on the spatial image of the detected object, projection measurement of the data of the two-dimensional spatial image message encompassing the object under an uncorrelated random measuring base is realized, where the projection measurement results is recorded via a single pixel detector, and finally the image is reconstructed by means of a nonlinear optimization algorithm. By combining the single pixel camara with a traditional spectrometer system, such as one consists of a grating or a lens with a linear array detector, spectral imaging is realized. Due to constraint from the transmission spectrum sections and size of the window material, the compressive imaging solution is difficult to apply in mid-far infrared imaging domains. Moreover, the imaging system is based on amplitude modulation with half of the optical energy being lost, and thus, has low energy efficiency.

The Brady group at Duke University in the United States combines compressive sensing with spectral imaging to realize pseudo single-exposure compressive spectral imaging based on amplitude mask. An object is first imaged on a first imaging plane, a binary amplitude mask is placed on the imaging plane for amplitude modulation of the image of the object, the modulated image is imaged on a second imaging plane via a beam splitting prism, and detection is conducted on the second imaging plane via a matrix detector. For the imaging spectral device, global projection measurement is conducted only on the spectral dimension to realize compressive collection. Globlal projection measurement is not performed on the spatial dimension, and hence compressive collection is not realized on the spatial dimension. Moreover, the system realizes higher spatial resolution by means of moving the amplitude mask with a further defect of being based on amplitude modulation, and thus also has a low energy efficiency.

The Shengshen Han group of Shanghai Institute of Optics and Fine Mechanics of Chinese Academy of Sciences proposes a compressive spectral imaging system based on a random wavefront phase modulator. The system employs the random wavefront phase modulator to conduct random wavefront phase modulation on an optical field and performs projection measurement under an uncorrelated random measuring base on an entirety of data encompassing the two-dimensional spatial image information and the one-dimensional spectral information of the object. However, due to different modulating effect of the random wavefront phase modulator on different spectra and a limited scope of response spectra and a limited dynamic scope of a photodetector, the system is incapable of realizing wideband hyperspectral imaging with high spatial resolution and high spectral resolution. Moreover, the system does not make use of correlation of the two-dimensional spatial image information on the spectral dimension, and therefore does not realize data compression on the spectral dimension.

SUMMARY OF THE INVENTION

The present invention provides a wideband hyperspectral imaging system that is based on random grating for realizing wideband spectral image of high spatial and spectral resolution from ultraviolet to mid-far infrared spectra via a single exposure, so as to increase detecting speed and sensibility and to decrease the number of detecting units.

The present invention provides a random grating based compressive sensing wideband hyperspectral imaging system comprising a front imaging system, an optical splitting system, two or more branches, and a computer; each of the branch comprises an exit pupil transformation system, a random grating, and a photodetector system; the front imaging system and the optical splitting system are successively arranged along an incident light beam; the optical splitting system splits a wideband light beam into two or more splitting spectral light beam branches with continuous spectra; the exit pupil transformation system, the random grating, and the photodetector system are successively arranged along each branch; each of the photodetector system is connected with the computer; the exit pupil transformation system of each of the branch is situated on an imaging plane of the object on the branch enroute of the front imaging system; the random grating of each of the branch is situated on an imaging plane of an exit pupil of the front imaging system in route of the exit pupil transformation system of the branch; the photodetector system of each of the branch is behind the random grating of the branch.

In the present invention, the front imaging system is a telescope system, a camera system, or a microscope system.

In the present invention, the optical splitting system is a dichroic beam combiner, or a bandpass filter.

In the present invention, the exit pupil transformation system of each of the branch is an imaging lens system.

In the present invention, the photodetector system of each of the branch comprises an imaging amplification system and a photodetector, and the photodetector of each of the branch is arranged on an imaging plane of the imaging amplification system of the branch.

In the present invention, the photodetector is a CCD array of randomly distributed detecting units.

In the present invention, the random grating components and the photodetectors with different parameters are selected for different spectra on each of the branch.

In the present invention, the dichroic beam combiner or the bandpass filter splits a wideband optical field ranging from ultraviolet to mid-far infrared into numerous split light beams with multiple continuous spectra on the spectral dimension. The random grating realizes random wavefront phase modulation on the optical field, generating a random light intensity distribution on the detecting plane on one hand while realizing dispersion on the spectral dimension on the other hand. A specific column of the measurement matrix for the system corresponds to a speckle field formed from a narrowband point source with a certain central wavelength on a specific location of the object plane. Due to the random distribution of the random gratings, the measurement matrix is a random matrix. Speckle fields formed from different narrowband point sources with different locations on the object plane or different central wavelengths are uncorrelated, and correspondingly, different columns of the measurement matrix are uncorrelated. Therefore, the measuring system of the system satisfies the condition of compressive sensing. From the perspective of data acquisition, the system accomplishes data acquisition in two steps.

The first step is system calibrating: projection measurement under an uncorrelated random measuring base is performed on an entirety of data encompassing the two dimensional spatial image information and the one dimensional spectral information of the detected object, results of the projection measurement is recorded with the photodetector, thus a calibration matrix for the system is obtained.

The second step is data reconstructing: correlation between neighboring spectra is exploited and a linear or nonlinear optimization algorithm is employed to reconstruct three-dimensional spectral image information of the detected object from the measured signals.

The system of the present invention typically comprises the front imaging system, the more than 1 dichroic beam combiner, the exit pupil transformation system of each of the branch, the random grating of each of the branch, the imaging amplification system of each of the branch, the photodetector of each of the branch, and the computer.

The front imaging system is employed for imaging the object onto the first imaging plane of each of the branch.

The more than 1 dichroic beam combiner are employed for splitting a wideband spectrum into multiple split light beams with continuous spectra. Each branch adopts a suitable random grating and a suitable photodetector so as to improve spatial resolution, spectral resolution, and detection sensitivity of the imaging system. Further, the optical splitting system achieves higher system signal-to-noise ratio on the multiple spectra, thus improving spectral imaging quality.

The exit pupil transformation system of each of the branch is employed for imaging the exit pupil of the front imaging system onto the random grating of the branch, so that optical fields from various incident directions all pass through the center of the random grating of the branch, realizing expansion of the imaging field.

The random grating of each of the branch conducts random wavefront phase modulation and dispersion on the optical field of the propagation spectra of the branch coming from the object plane, so that the optical field of the propagation spectra of the branch coming from a point of the object plane forms a speckle field with relative high contrast on a spatial region behind the random grating. Since the optical fields of the object plane are spatially incoherent, the light intensity distribution on the entire detecting plane is a superposition of intensity of the speckle field formed from light coming from various points on the object plane. Random grating devices with different parameters are selected according to different allocated spectra. For example, frosted glass with little undulation and large granules is suitable for the random grating device on the visible or near infrared spectra. While on the mid-far infrared spectra, frosted glass with large undulation and small granules is suitable for the random grating device. At the meantime, suitable materials with high transmittance for the various spectra are selected for the random grating device.

The amplifying imaging system of each of the branch images the speckle field passing from a location with a specific distance from the random grating of the branch onto the photodetector of the branch, and measures the imaged speckle field.

The technical effects of the present invention are as follows:

1. The present invention proposes a random grating based compressive sensing wideband hyperspectral imaging system. The present invention conducts phase modulation based on random grating and performs projection measurement under an uncorrelated random measurement base on the three-dimensional spectral image data (two-dimensional spatial image information and one-dimensional spectral information) of the object for realization of compressive collection of three-dimensional spectral image data. The system does not lose optical energy in the modulation stage, and is more energy efficient in comparison with a compressive imaging system based on amplitude modulation. As compared with a compressive imaging system based on random spatial phase modulation, the system realizes further compressive collection of the image data on the spectral dimension, thus further reducing data collection amount and requirement of pixel number and measurement time for the detector. Moreover, dispersion effect of the random grating on the optical field further increases spectral resolution of the system.

2. The exit pupil transformation system adopted by the system greatly expands the imaging field of the system. The exit pupil transformation system of each of the branch images the exit pupil of the front imaging system onto the random grating of the branch, so that optical fields from various incident directions all pass through the center of the random grating, thus realizing expansion of the imaging field without increasing the detection pixel number.

3. The system acquires wideband spectral image information in a single measurement, thus greatly shortening detecting time and substantially improving spatial resolution and spectral resolution. The optical splitting system enables the random grating and the photodetector to optimize spectral imaging on each branch and improves detection sensitivity, spatial resolution and spectral resolution of the system, thus realizing wideband hyperspectral imaging.

Reference numbers are used in the figures to refer to the following structures:

1-front imaging system; 2 and 2'-dichroic beam combiner; 3, 3' and 3"-exit pupil transformation system; 4, 4', and 4"-random grating; 5, 5', and 5"-photodetector; 6-computer; 7, 7', and 7"-imaging amplification system; 21-object plane; 22-exit pupil of the front imaging system; 23, 23', and 23"-first imaging plane; and 24, 24', and 24"-initial detection plane.

DETAILED DESCRIPTION OF THE INVENTION AND EMBODIMENTS

Figure 1:
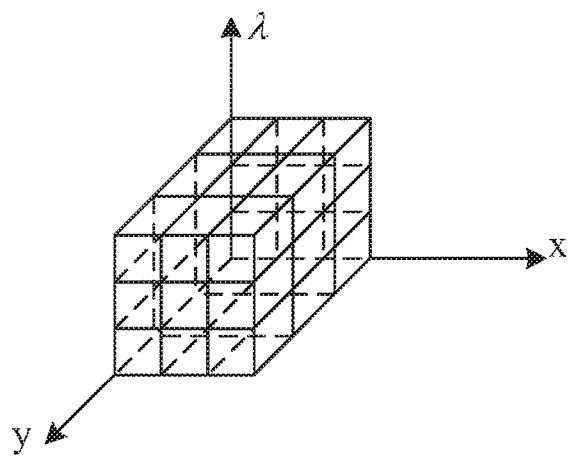
FIG. 1 shows the format of data as acquired via spectral imaging as discussed in the background art. Each cube in FIG. 1 stands for a data point; (x, y) stands for a spatial location; and λ stands for a wavelength.
Figure 2:
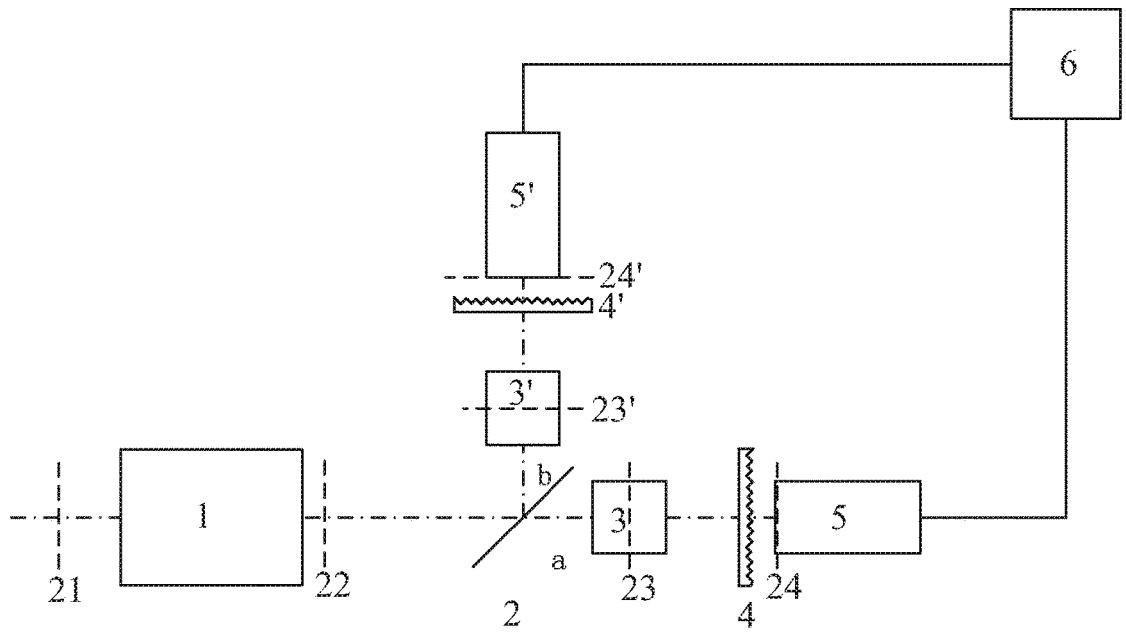
FIG. 2 is diagram showing the structure of a first embodiment of the random grating based compressive sensing wideband hyperspectral imaging system of the present invention.

In connection with FIG. 2, the acquisition of the hyperspectral image information by the random grating based compressive sensing wideband hyperspectral imaging system of the present invention is expounded in details. As shown in FIG. 2, the random grating based compressive sensing wideband hyperspectral imaging system of the present invention comprises a front imaging system 1, a dichroic beam combiner 2, exit pupil transformation systems 3 and 3', random gratings 4 and 4', and photodetector systems 5 and 5' on branches a and b respectively. The front imaging system 1 and the dichroic beam combiner 2 are successively arranged along an incident light beam, with the dichroic beam combiner 2 splitting the wideband light beam into two split spectral light beam branches a and b with continuous spectra. The exit pupil transformation systems 3 or 3', random gratings 4 or 4', photodetector systems 5 or 5' are successively arranged on branch a or b, respectively. Photodetector systems 5 and 5' on the branches a and b are connected with computer 6. For branch a, the exit pupil transformation system 3 is situated on an imaging plane 23 of the object 21 on the branch in route of the front imaging system 1, the random grating 4 is situated on an imaging plane of an exit pupil 22 of the front imaging system 1 in route of the exit pupil transformation system 3 of the branch, the photodetector system 5 is behind the random grating 4 of the branch with a distance. For branch b, the exit pupil transformation system 3' is situated on an imaging plane 23' of the object 21 on the branch in route of the front imaging system 1, the random grating 4' is situated on an imaging plane of an exit pupil 22 of the front imaging system 1 in route of the exit pupil transformation system 3' of the branch, the photodetector system 5' is behind the random grating 4' of the branch with a distance.

In view of diffraction effects of optical fields, the random grating 4 on the branch a and the random grating 4' on the branch b map the various narrowband point light sources from various locations and with various central wavelengths on the object plane 21 onto a speckle field with a relatively high contrast on the initial detection planes 24 and 24', respectively. Different spatial locations and different central wavelengths correspond to different speckle fields, with correlation decreasing with the increase of spatial distance between point sources and of spacing between central wavelengths. By means of correlation operation or nonlinear optimization algorithm, different speckle fields can be differentiated. Spectral image on the object plane 21 may be regarded as superposition of point sources of different spatial positions and different central wavelengths. Since the optical fields on the object plane 21 are incoherent, optical intensity distribution on the initial detection plane 24 or 24' is a superposition of the intensity of the speckle fields corresponding to these different point sources. Let the number of spectra of the wideband spectrum be L, the size of an object spatial image pixel in a single wavelength is N, the number of detection points is M, then the entire spectral imaging process can be described as follows:

$$\begin{pmatrix} y_1 \\ y_2 \\ \ldots \\ y_M \end{pmatrix}_M = \begin{pmatrix} A_{11} & A_{12} & \ldots & A_{1L} \\ \ldots & \ldots & \ldots & \ldots \\ \ldots & \ldots & \ldots & \ldots \\ A_{M1} & A_{M2} & \ldots & A_{ML} \end{pmatrix}_{M \times (L \times N)} \begin{pmatrix} x_1 \\ x_2 \\ \ldots \\ x_L \end{pmatrix}_{L \times N} \quad (2)$$

$$\text{wherein } x_i = \begin{pmatrix} x_{i1} \\ x_{i1} \\ \ldots \\ x_{iN} \end{pmatrix}, i = 1, \ldots, L; \quad (3)$$

representing the image information of the object in the ith spectrum.

$$A_{ij} = (A_{ij1} \; A_{ij2} \ldots A_{ijN}), i=1, \ldots, M; j=1, \ldots, L. \quad (4)$$

Matrix A is a matrix with M rows and L×N columns, with each column thereof representing the optical intensity of the speckle field formed on the detection plane from a narrowband light of a specific location and a specific central wavelength of the object plane 21.

Prior to wideband hyperspectral imaging, the system needs to perform calibration in order to obtain the matrix A. First a narrowband point light source of different central wavelength λ is placed on a different location (x, y) on the object plane 21, with the corresponding light intensity values being recorded by the various detecting units fixed on the detection plane of each branch. The light intensity values are normalized as a column of the measurement matrix. Speckle light intensity distribution corresponding to different (x, y, λ) constitutes different columns of the measurement matrix, and thus the matrix A for calibration and measurement is obtained. During imaging measurement, light intensity value detected by the detecting units of each branch is recorded with only one exposure as a vector Y. Thus the matrix A and Y are obtained. By making use of inter-spectral correlation of optical fields and by means of linear or nonlinear optimization algorithm, the spectral image information of the object is recovered.

Figure 3:
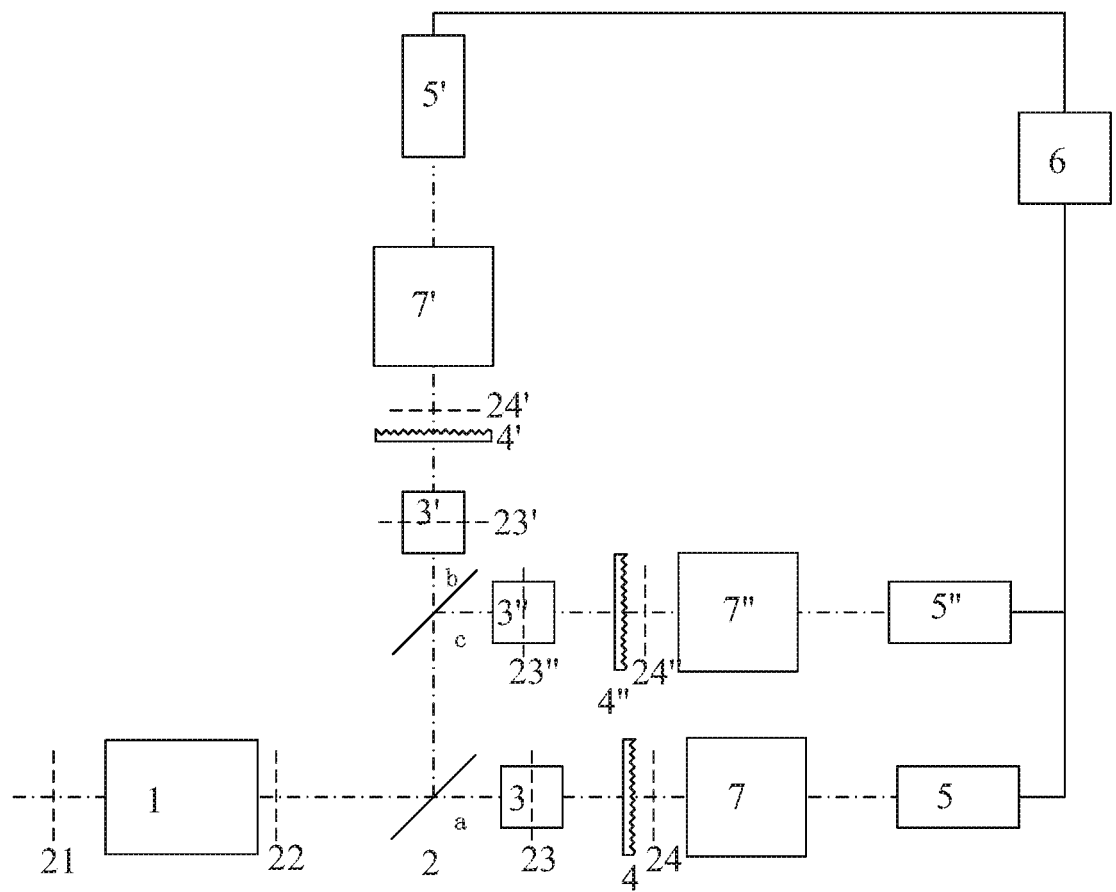
FIG. 3 is diagram showing the structure of a second embodiment of the random grating based compressive sensing wideband hyperspectral imaging system of the present invention.

FIG. 3 shows the second embodiment of the random grating based compressive sensing wideband hyperspectral imaging system of the present invention. The calibration and imaging processes in the system as shown in FIG. 3 are similar to those of FIG. 2. The difference lies in that the wideband optical field is split on spectral dimension into 3 split light beams with continuous spectrum, with photodetector 5 recording the image formed from the initial detection planes 24 on the branch a in route of the imaging amplification system 7, the photodetector 5' recording the image formed from the initial detection planes 24' on the branch b in route of the imaging amplification system 7', and the photodetector 5" recording the image formed from the initial detection planes 24" on the branch c in the route of the imaging amplification system 7".

We claim:

1. A random grating based compressive sensing wideband hyperspectral imaging system, comprising
    a front imaging system,
    an optical splitting system,
    two or more branches, and
    a computer;
    wherein each of the branches comprises
        an exit pupil transformation system,
        a random grating, and
        a photodetector system;
    the front imaging system and the optical splitting system are successively arranged along an incident light beam;
    the optical splitting system splits a wideband light beam into two or more split spectral light beam branches with continuous spectra;
    the exit pupil transformation system, the random grating, and the photodetector system are successively arranged along each branch;
    each of the photodetector system is connected with the computer;
    the exit pupil transformation system of each branch is situated on an imaging plane of the object on the branch in route of the front imaging system;
    the random grating of each branch is situated on an imaging plane of an exit pupil of the front imaging system in route of the exit pupil system of the branch; and
    the photodetector system of each branch is behind the random grating of the branch.

2. The random grating based compressive sensing wideband hyperspectral imaging system of claim 1, wherein the front imaging system is a telescope system, a camera system, or a microscope system.

3. The random grating based compressive sensing wideband hyperspectral imaging system of claim 1, wherein the optical splitting system is a dichroic beam combiner or a bandpass filter.

4. The random grating based compressive sensing wideband hyperspectral imaging system of claim 1, wherein the exit pupil transformation system of each branch is an imaging lens group.

5. The random grating based compressive sensing wideband hyperspectral imaging system of claim 1, wherein the photodetector system of each branch comprises
    an imaging amplification system, and
    a photodetector,
    wherein the photodetector of each branch is arranged on an imaging plane of the imaging amplification system of the branch.

6. The random grating based compressive sensing wideband hyperspectral imaging system of claim 1, wherein the photodetector is a CCD array of randomly distributed detecting units.

7. The random grating based compressive sensing wideband hyperspectral imaging system of claim 1, wherein the random grating and the photodetectors are selected with different parameters for different spectra on each of the branch.

* * * * *